THOMAS E. C. BRINLY.
Improvement in Cotton-Seed Planters.
No. 115,929.  Patented June 13, 1871.
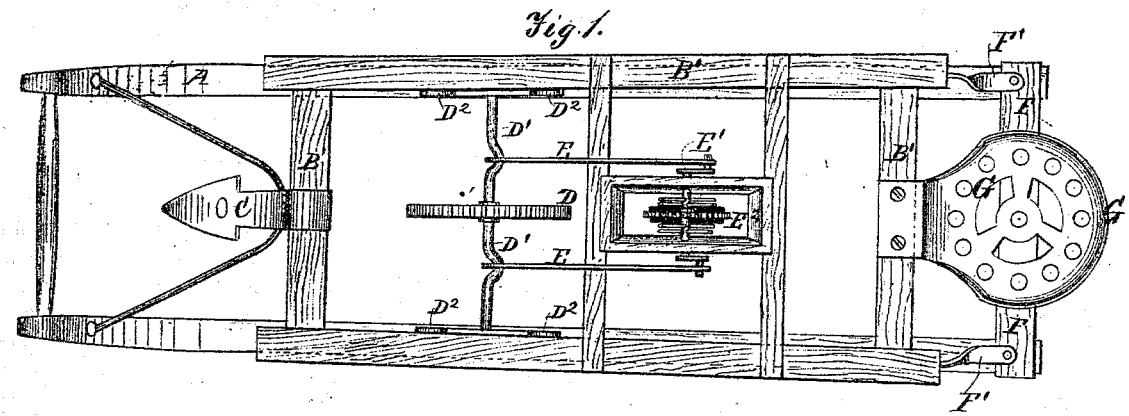
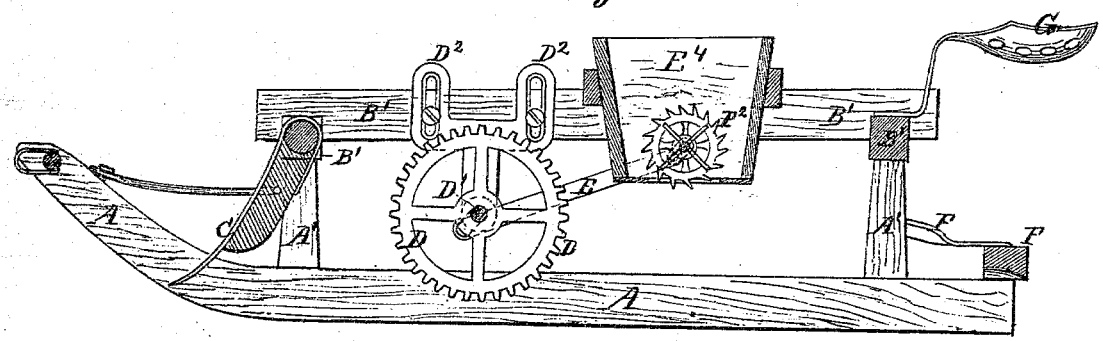
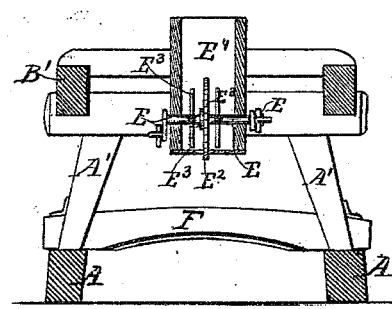

UNITED STATES PATENT OFFICE.

THOMAS E. C. BRINLY, OF LOUISVILLE, KENTUCKY.

IMPROVEMENT IN COTTON-SEED PLANTERS.

Specification forming part of Letters Patent No. 115,929, dated June 13, 1871.

*To all whom it may concern:*

Be it known that I, THOMAS E. C. BRINLY, of Louisville, in the county of Jefferson and State of Kentucky, have invented certain Improvements in Cotton-Seed Planters; and I do hereby declare that the following is a full, clear, and exact description thereof, reference being had to the annexed drawing making part of this specification, in which—

Figure 1 is a plan view of my improved machine, showing the frame, the plow for opening the furrow, the driving-wheel, the distributing mechanism, the seed-coverer, and the driver's seat. Fig. 2 is a longitudinal vertical section through the center of Fig. 1, showing the parts above named, and, in addition thereto, the method of adjusting the height of the driving-wheel. Fig. 3 is a transverse vertical section through the seed-box.

Corresponding letters refer to corresponding parts in the several figures.

This invention relates to machines for planting cotton and other seeds; and it consists in the construction, combination, and arrangement of some of the parts of which it is composed, as will be more fully described hereinafter.

To enable those skilled in the art to make and use my invention, I will proceed to describe its construction and operation.

A A refer to the runners of the frame or sled, which support and carry the other parts of the machine. To the upper surfaces are affixed posts or standards A' A', which rise for any desired distance, their upper ends being provided with cross-beams B B, to which the upper longitudinal beams B' B' of the frame are attached, as clearly shown in the drawing. C refers to a plow or cultivator, which is arranged centrally between the runners, and upon the front lateral beam B, from which point it extends downward at about the angle shown in the drawing, its lower end being about on a line with the lower surface of the driving-wheel. The office of this plow or shovel is to open a furrow or form a groove in the bed which has been raised for the reception of the seeds, the runners of the sled passing over the sides of such bed or ridge, and thus permitting the plow to enter its upper surface at or near the center. From the stock or helve of this plow or shovel braces extend to and connect with the runners for the purpose of keeping it in its proper position, and by providing such braces with a swivel-joint and cutting a screw upon one portion of each lever, the position of the plow may be at any time changed, and its point may be raised or lowered to correspond with the position of the driving-wheel D, which is placed upon a cranked axle, $D^1$, said axle having its bearings in adjustable bearings $D^2 D^2$, which are fastened to the longitudinal beams B' B'. These bearings are provided with slots in their upper ends, so that they may be raised or lowered at pleasure, and so that the lower surface of the driving-wheel may run upon the lower surface of the furrow formed by the plow or shovel C. The shaft $D^1$ extends across the machine, it having its bearings in the hangers $D^2 D^2$, and being bent so as to form a crank, so that the motion given to it by the driving-wheel may be imparted to the connecting-rods E E, and through them to cranks $E^1 E^1$ upon the shaft of the feed-wheel $E^2$, which is located in the seed-box $E^4$, which is located upon cross-beams extending from one of the longitudinal beams to the other, and is so arranged with reference to the driving-wheel D that, as it is rotated by the movement of the sled over the earth, motion will be given to the feed-wheel in the same, and thus the cotton-seed will be fed regularly through the aperture in its bottom. In order that the seed may be agitated and not allowed to settle in a solid mass in the bottom of the seed-box, and thus be prevented from feeding properly, a series of arms or rods is provided in or upon the shaft E of the feed-wheel, so that, as the same is rotated, it may keep the seeds from becoming clogged together in that portion of the box.

The serrated feed-wheel which is shown in the drawing I regard as the best form to be used in the planting of cotton-seed; but when the machine is to be used for planting corn or other kinds of seeds, it may be replaced by a wheel having in it pockets or recesses arranged to hold just the number of seeds which it is desirable to drop at one time, or in a particular place.

F refers to a coverer, it being a beam hinged, by means of the levers F' F', to the rear posts A' A', so that it may float up and down, and thus accommodate itself to the height of the ridge or bed in which the seeds are planted.

In the example shown the beam is made concave upon its lower surface, for the purpose of inclining the earth over which it passes toward its center; but this formation is not absolutely necessary, as it will answer a good purpose without being thus constructed.

A driver's seat, G, is placed upon the rear portion of the machine, thus enabling the operator to sit there and guide his team and at the same time watch the operation of the mechanism; and by placing a suitable platform upon the sled the seed necessary for a day's work may be carried, and thus much time saved that would otherwise be spent in keeping the machine supplied with seeds.

What I claim as my invention, and desire to secure by Letters Patent, is—

1. The arrangement of the shovel C upon the frame of the machine and directly in front of the driving-wheel, for the purpose of opening a furrow for said wheel to run in, and for the reception of the seed as it passes from the seed-box.

2. The combination of the vertically-adjustable driving-wheel, the seed-box, and the seed-distributing wheel, and the mechanism for operating said distributing-wheel, the parts being constructed and arranged upon runners, substantially as and for the purpose specified.

3. The combination of the vertically-adjustable driving-wheel and the frame of the seed-planting machine, the whole being arranged upon runners, substantially as and for the purpose set forth.

4. The combination of the seed-coverer F F' and the frame of a seed-planting machine when such frame is carried upon runners, substantially as and for the purpose set forth.

In testimony whereof I have signed my name to this specification in the presence of two subscribing witnesses.

T. E. C. BRINLY.

Witnesses:
WM. STIRRETT,
FRANK HAMMOND.